United States Patent
Uchiyamada et al.

[15] 3,684,309
[45] Aug. 15, 1972

[54] INFLATABLE SAFETY DEVICE FOR VEHICLE PASSENGERS

[72] Inventors: Kameo Uchiyamada; Kazuo Sato; Tomio Hisatsune, all of Aichi-ken, Japan

[73] Assignee: Toyota Jidosha Kogyo Kabushiki Kaisha, Toyota-shi, Aichi-ken, Japan

[22] Filed: Jan. 18, 1971

[21] Appl. No.: 107,113

[30] Foreign Application Priority Data

Jan. 24, 1970  Japan .....................45/6558

[52] U.S. Cl. .............280/150 AB, 180/98, 343/7 ED
[51] Int. Cl. ...............................................B60r 21/06
[58] Field of Search..............180/82, 91, 96, 98, 103; 280/150 AB; 343/7 R, 112 CA

[56] References Cited

UNITED STATES PATENTS

| | | | |
|---|---|---|---|
| 2,931,665 | 5/1960 | Sandor | 280/150 AB |
| 3,336,045 | 8/1967 | Kobori | 280/150 AB |
| 3,187,328 | 6/1965 | Vetter | 343/7 ED |
| 3,406,774 | 10/1968 | Lacey | 180/96 |
| 3,420,572 | 1/1969 | Bisland | 343/7 ED |
| 3,442,387 | 5/1969 | Hodgson et al. | 180/98 |
| 3,549,169 | 12/1970 | Oldberg et al. | 180/103 |
| 3,552,769 | 1/1971 | Kemmerer et al. | 180/91 X |

*Primary Examiner*—Kenneth H. Betts
*Attorney*—John J. McGlew and Alfred E. Page

[57] ABSTRACT

A safety device for vehicle passengers, of the type in which at least one air bag is inflated responsive to detection of an object in the vehicle path in advance of contact of the vehicle with the object, includes a source of fluid under pressure and a valve, operable responsive to detection of such an object, to connect the source to a line leading to at least one inflatable air bag. A valve mechanism is interposed in the line and normally connects the line to the air bag. An impact detector is operable to detect the force of an impact, and to provide an output signal when the force has less than a predetermined magnitude. Relay means are operable responsive to the output signal, to operate the valve mechanism to disconnect the line from the air bag to interrupt inflation of the air bag and to connect the air bag to atmosphere for deflation. A timer may be included to control the time of operation of the valve mechanism by the output signal of the impact detector.

9 Claims, 9 Drawing Figures

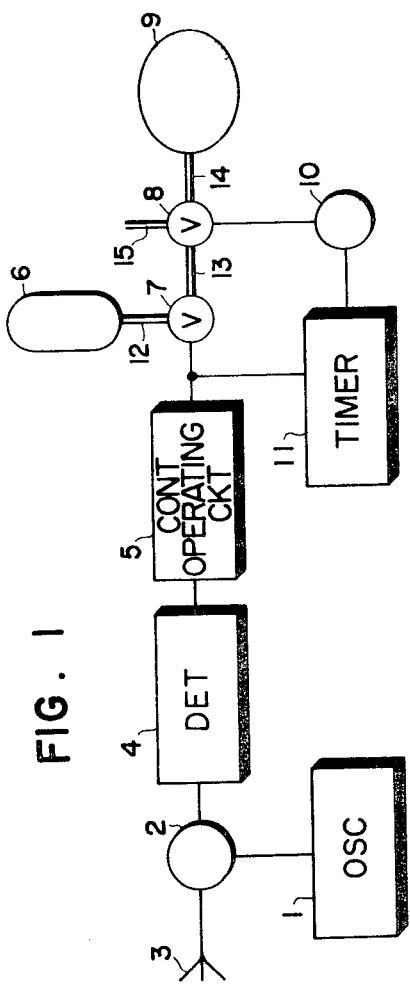
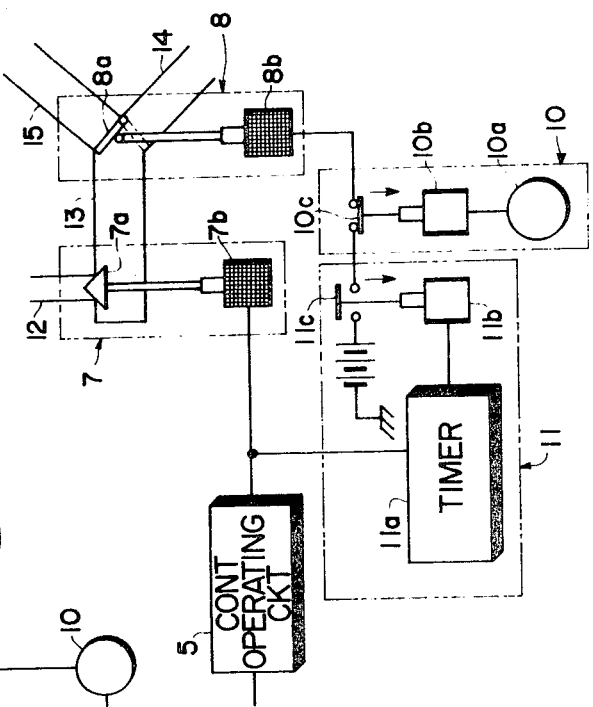
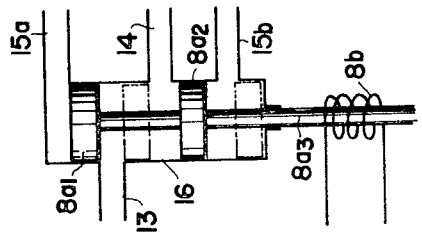
FIG. 1
FIG. 2
FIG. 3

INFLATABLE SAFETY DEVICE FOR VEHICLE PASSENGERS

BACKGROUND OF THE INVENTION

In the event of minor shocks imparted to a vehicle, such as when a vehicle collides with a small object, injuries to passengers, as a result of impact with the interior of the vehicle body, are not probable, so that protective means, such as inflatable air bags need not be actuated. If, in such a case, the safety device is actuated, secondary injuries may be caused due to reckless running of the vehicle resulting from the loss of view of the driver or restriction of the driving direction. In this case, it is necessary to interrupt the operation of the safety device, or to restore it to its non-operated condition.

In the event of a more serious crash of the vehicle, the passengers would be seriously injured due to severe shocks, so that various safety devices have been proposed to prevent passengers from being injured upon the occurrence of an actual crash of the vehicle. Such safety devices include an impact detector arranged to detect the impact force effective upon the occurrence of the crash, and a protective means adapted to be actuated only upon reception of signals from the impact detector.

The operation of conventional safety devices will be described with reference to FIGS. 4a and 5a, in which the abscissae represent time and the ordinates represent the rate of inflation of the air bag, with complete inflation of the air bag being indicated at 100 percent. The time of crashing of the vehicle is indicated at $t_3$, and the means detecting the presence of the obstructing object, or another vehicle, issues signals after some time delay. It further requires some time until the inflation of the air bag is started by the signals from the impact detector.

In practice, inflation of an air bag is initiated at the time $t_6$, and the air bag continues to inflate in accordance with the illustrated characteristic in FIG. 4a. It is assumed that the time required from the crash of a vehicle until a passenger is thrown against a part of the vehicle body due to the impact force is usually 10 ms. Therefore, if the safety device is to operate according to the characteristic curve, the inflation of the air bag cannot be completed before the time $t_8$, which is a time when the passenger is thrown against the vehicle body, so the safety of the passenger cannot be assured. Even if a compressed air generator, the lines, the air bags and the valve mechanism, as used as present, have an excellent response, the above-described shortcoming cannot be eliminated, and it is quite difficult to protect passengers, in a collision, by the described safety device.

In order to overcome this drawback, safety devices have been proposed wherein Doppler-shifted waves, reflected from an object in the vehicle path, are received by using a super short wave or ultra-short wave special radar, and the collision is sensed in advance by deriving the relative speed and the relative distance between the vehicle and the object in its path from the reflected waves, thus actuating the safety device to protect the passengers with certainty. The drawback of this collision sensing method is that it cannot foretell how large an impact force will result from the crash. In other words, it cannot discriminate the difference between a small object, such as a dog or a cat, and a large object, such as a vehicle or a building. Consequently, even if the object is a small animal, such as a dog or a cat, the safety device is actuated, resulting in the occurrence of the before mentioned secondary injuries.

SUMMARY OF THE INVENTION

This invention relates to safety devices for protecting passengers during a collision of a vehicle, by sensing the imminence of a collision in advance of the actual crash. More particularly, the present invention is directed to such a safety device in which the inflation of a protective air bag, or the like, is controlled responsive to sensing the probable force of an impact in a manner such that the air bag is not fully inflated, its inflation is interrupted, or the air bag is deflated, when the probable impact has less than a predetermined magnitude.

In accordance with the invention, a safety device for vehicle passengers comprises a special radar which radiates either super short waves or ultra-short waves and receives reflected waves, an operating circuit which calculates the relative speed and relative distance between the vehicle and a reflecting object by detecting the Doppler-shifted frequency and the level of the reflected wave and issues the collision sensing signals by calculating the expected time of crash in accordance with the relative time and distance, valve mechanism operable to connect an air source with air bags upon receiving a collision sensing signal, an impact detector which detects the impact force of the collision, and a mechanism arranged to prevent further inflation of the air bag, through operation of the valve mechanism, when the impact detector detects an impact force which does not exceed a predetermined magnitude.

The object of the invention is to provide, in safety devices for vehicle passengers of the type wherein air bags are inflated before occurrence of the crash by sensing the imminence of a crash, a safety provision, wherein the inflation of an air bag is fully completed before the impact of the passenger with the vehicle body, thus providing safe and certain protection of the passengers, and wherein undesired actuation of the safety device is prevented by detecting the impact force upon occurrence of a crash, thus protecting the passengers under any circumstances. The predetermined impact force is intended to mean such an impact force wherein the passenger will strike against the vehicle body, due to the impact or where the passenger is injured due to such impact. This predetermined impact force is determined experimentally by the process of human engineering.

In accordance with the collision sensing method of the invention, a radiated signal having a first frequency is radiated from the vehicle, and a reflected signal, having a second frequency Doppler-shifted from an object in the path of the vehicle, is received. Predetermined signals, for sensing the collision, are issued when the product of a first quantity of electricity proportional to the difference frequency of the radiated signal and a second quantity of electricity proportional to the level of the reflected signal, containing the difference frequency of the two signals, exceeds a predetermined value.

In other words, the relative speed between the vehicle and an object in its path can be obtained from the change in frequency due to the Doppler effect on the radiated signals. It is known experimentally that, if an object or obstruction, reflecting radiated signals, comes within the nearest distance, which is less than several meters, where the safety device of the invention is actuated, the level of the reflected signal is inversely proportional to the distance between the vehicle and the object in the vehicle path. Thus, the distance between the vehicle and such an object can be determined from the level of the reflected signal. When the product of the first quantity of electricity and the second product of electricity is obtained, the inverse number of the time required until the vehicle crashes with the object can be determined.

When a signal having the frequency $f_1$ is radiated, the relation between the frequency $f_2$ of the signal reflected from the object and the relative speed $v$ may be expressed by the following equation in which the signal propagation speed is C:

$$f_2 = \frac{C+V}{C-V} f_1 \quad (1)$$

From this equation, the difference frequency $f_d$ between the frequencies $f_1$ and $f_2$, hereinafter referred to as Doppler signal frequency, may be determined as follows:

$$f_d = f_2 - f_1 = 2f_1/C = k_1 v \quad (2)$$

Since the frequency $f_1$ of the radiated signal and the propagation speed $C$ are known in advance, the frequency $f_d$ of the Doppler signal can be obtained as a value proportional to the relative speed $v$ between the vehicle and an object in its path. In equation (2) $k_1$ is a proportionality constant.

As mentioned, the level of the Doppler signal is inversely proportional to the distance between the vehicle and an object in its path, in the smallest distance wherein the safety device of the invention is to be actuated, so that the relation between the level G of the Doppler signal and the distance D can be expressed as follows:

$$G = k_2/D \quad (3)$$

In accordance with the invention, the quantity of electricity proportional to the frequency $f_d$ of the Doppler signal, and the quantity of electricity proportional to the level of the signal, are respectively determined, and then the product $S$ of these quantities is derived. In other words, the product of the equations (2) and (3) is obtained as follows:

$$f_d \times G = k_1 v \frac{k_2}{D} = k_1 k_2 \frac{v}{D} = k_1 k_2 \frac{1}{T} \quad (4)$$

In this equation, $T$ equals $D/v$, which indicates the time duration from the moment when collision is sensed until the occurrence of the actual collision, provided that the vehicle will crash with the object at the relative speed $v$ which has been derived when the obstruction in the vehicle path has been detected. Hereinafter, this time will be referred to as "remaining time." However, in the range of less than several meters, with which this invention is particularly concerned, the vehicle can be regarded as moving at a constant speed in a fixed direction. Thus, from equation (4), the product S can be expressed as follows:

$$S = k(1/T) \quad (5)$$

Consequently, when the remaining time $T$ is decreased to less than the specified value, hereinafter referred to as "limit time $T_o$" or when the product $S$ of quantities of electricity exceeds the specified value $S_o$, a collision is sensed and a predetermined signal is issued, thus actuating the safety device for vehicle passengers to protect the passengers. The limit time $T_o$ is defined as the time when it is impossible to avoid a crash during the remaining time $T$, no matter in what way the vehicle is manipulated. This means that the collision sensing signal is issued when the distance between the vehicle and the object in its path is larger, if the relative speed is high, and that the signal is issued when the distance is smaller, if the relative speed is low. Thus, the safety device for vehicle passengers is actuated in a predetermined time before the occurrence of the crash and irrespective of the speed of the vehicle at the time of the crash.

As mentioned above, in an arrangement wherein the safety device is actuated before a crash by sensing the imminence of the crash, an air bag is inflated even in the case of minor shocks, as in the case of crashing with a light object or a small animal, thus resulting in over protection of passengers or in secondary injuries, due to reckless running of the vehicle or crashing with another vehicle due to the obstruction of the driver's view or of the vehicle steering resulting from the undesired inflation of the air bag. In order to prevent such secondary injuries, it is necessary to interrupt the inflation of the air bag, or to deflate it, so as not to obstruct the subsequent driving when the detected impact force is short of the predetermined magnitude. At the same time, it is necessary that full inflation of the air bag be completed well before a passenger strikes against a part of the vehicle body.

Additionally, in such a collision sensing method, a safety device is actuated due to, for example, mischief, when no actual crash will occur. In order to prevent unwanted actuation of the safety device, it is necessary to interrupt the inflation of the air bag, or to deflate the air bag, unless a severe shock occurs during a short period of time after the time T remaining from the moment of sensing a crash until the occurrence of an actual crash, has elapsed.

An object of the invention is to provide an improved safety device for protecting passengers in the event of a collision of a vehicle.

Another object of the invention is to provide such an improved safety device which discriminates between large impact forces and small impact forces.

A further object of the invention is to provide such a safety device in which inflation of an air bag is interrupted, or the air bag is deflated, when the magnitude of the impact force as a result of a collision is less than a predetermined value.

For an understanding of the principles of the invention, reference is made to the following description of typical embodiments thereof, as illustrated in the accompanying drawing.

BRIEF DESCRIPTION OF THE DRAWING

In the drawing:

FIG. 1 is a schematic block diagram of one embodiment of a safety device for vehicle passengers, in accordance with the invention;

FIG. 2 is a schematic diagram illustrating one embodiment of a change-over valve mechanism, in accordance with the invention;

FIG. 3 is a schematic diagram illustrating another embodiment of the change-over valve mechanism, in accordance with the invention.

DESCRIPTION OF THE PREFERRED EMBODIMENTS

Figure 4A:
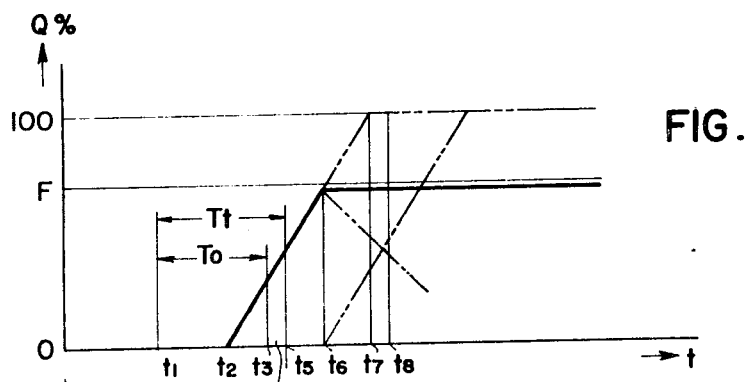
FIGS. 4a–4c and 5a–5c are graphic illustrations of the characteristics of the safety device for vehicle passengers, in accordance with the invention.

Referring to FIG. 1, a radio signal oscillator 1 is connected by a directional coupler 2 to a transmitting-receiving means, such as an antenna 3, and to a detector 4 whose output is connected to the input of a control operating circuit 5. The air source is indicated as a compressed air container 6 with which is associated a solenoid valve 7, a change-over valve or valve mechanism 8, and an inflatable air bag 9. An impact detector 10 is connected to the valve mechanism 8, and detects the impact force and a timing device or timer 11 issues signals after predetermined times. Lines 12, 13 and 14 are connected between compressed air container 6 and air bag 9, with solenoid valve 7 being interposed between lines 12 and 13 and normally blocking interconnection between these lines.

A line open to atmosphere is indicated at 15, and is usually or normally closed by change-over valve 8, which establishes communication between lines 13 and 14.

Radio signals from oscillator 1 are radiated, in an appropriate direction, through directional coupler 2, and the antenna 3 which may be installed at a suitable or specified place, such as the front or rear portion of the vehicle. If there is any object within the region determined by the directivity, radiant energy, etc. of antenna 3, the wave reflected from the object is received by the antenna. When an object comes within the search region, antenna 3 catches the reflectd waves and directs the same through the directional coupler 2 to detector 4, where a part of the output of oscillator 1 is mixed with the reflected wave. The mixture is then detected to obtain a Doppler signal having a difference frequency between the radiated and reflected waves.

The circuitry is so arranged that the quantity of electricity proportional to the frequency of the Doppler signals, and the quantity of electricity proportional to the level, are obtained in the control operational circuit 5, and predetermined signals are issued when the product of these two quantities exceeds a predetermined magnitude $So$. These signals are applied to solenoid valve 7, as a result of which valve 7 is operated to interconnect lines 12 and 13. Consequently, air under pressure, from container 6, flows through lines 12, 13, and 14 into air bag 9. The construction of change-over valve 8, impact detector 10 and timer 11 is shown in more detail in FIG. 2.

Referring to FIG. 2, parts therein corresponding to those in FIG. 1 are identified by the same reference numerals. The solenoid valve 7 comprises a valve member 7a which normally interrupts communication between lines 12 and 13, and comprises a solenoid 7b which is energized to attract valve member 7a when control operational circuit 5 issues collision sensing signals.

The change-over valve 8 comprises a valve member 8a which preferentially establishes communication between either the lines 13 and 14, or the lines 13, 15, and interrupts communication between the other pair. Valve 8 further comprises a solenoid 8b which is energized to attract valve member 8a when timing device 11 issues signals some time after the elapse of the limit time $To$ ensuing after issuance of collision sensing signals from circuit 5, unless impact detector 10 signals that the impact force is large.

The impact detector 10 comprises an accelerometer 10a which detects the impact on the occurrence of the collision, relay contacts 10c and a relay 10b which is energized to open contacts 10c when accelerometer 10a detects an impact force of greater than a predetermined magnitude.

Timer 11 comprises a timing circuit 11a which issues signals at a predetermined time $Tt$ set to a value a little greater than limit time $To$, after receiving collision sensing signals from control operational circuit 5, relay contacts 11c and a relay 11b which is energized by the signal from timing circuit 11a to close contact 11c.

Figure 4B:
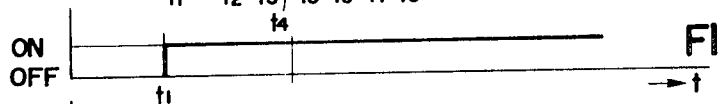
Figure 4C:
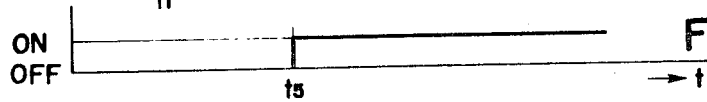

The operation of the safety device having the above-described construction will be described with reference to FIGS. 4a, 4b, and 4c. FIG. 4a illustrates the inflated and deflated condition of air bag 9, with the ordinates representing the inflation volume $Q$ expressed as 100 percent, when air bag 9 is fully inflated to protect passengers safely. The abscissae represent the lapse of time $t$. In FIG. 4b, the condition when solenoid 7b of the solenoid valve 7 is energized as shown by ON, and, in FIG. 4c, the condition where solenoid 8b of change-over valve 8 is energized as shown by ON. The abscissae in FIGS. 4b and 4c indicate the time $t$ corresponding to that shown in FIG. 4a. The limit where vehicle driving is obstructed by inflation of air bag 9 as shown at F%.

Oscillator 1 always emits signals of a specified frequency which are radiated from antenna 3. When an object comes into the region where reflected signals can be confirmed, that is, the search region of antenna 3, the reflected wave from the object is received by antenna 3. When the remaining time $T$ calculated in accordance with the reflected wave has become equal to the limit time $To$ (time $t_1$), control operational circuit 5 issues collision sensing signals. As soon as these sensing signals are issued, solenoid 7b is energized and valve member 7 is attracted, as shown in FIG. 4b. However, it takes some time until the action of valve member 7a is completed and inflation of air bag 9 is initiated, that is, actual inflation of air bag 8 is initiated at a time $t_2$. Then the air bag continues to inflate and the vehicle will strike against the object when the limit time $To$ has elapsed, up to the time $t_3$ after collision sensing signals have been emitted from the control operational circuit 5.

If the impact of a crash is severe, accelerometer 10a of impact detector 10 detects the magnitude of the impact at the time $t_4$ after some delayed action, so that relay 10b is actuated to open contacts 10c. Thus, as described above, when the impact is severe, solenoid 8b is disconnected from the power source. Consequently, when relay contacts 11c are closed at the time $t_5$ after lapse of a predetermined time $Tt$ since the issuance of the collision sensing signals, change-over valve 8 is not operated and lines 13 and 14 maintain communication with each other, so that air bag 9 continues to inflate according to the characteristic shown in FIG. 4a and this inflation is completed at the time $t_7$. Thus inflation of the air bag 9 is completed during the period from time $t_3$, when the vehicle strikes against the object, until the time $t_8$, when a vehicle passenger will impact the interior of the vehicle, thus safely protecting the vehicle passengers.

In the event of the vehicle collision with a small animal or in the case when the antenna 3 receives reflected radiated signals resulting from mischief, and collision sensing signals have been issued at time $t_1$, solenoid 7b is energized in the same manner as described above and air bag 9 begins to inflate at the time $t_2$ after some delay in the action. However, the impact force is very small even if the collision has occurred at the time $t_3$, or no actual collision takes place, and thus impact detector 10 does not operate. When a predetermined time $Tt$ has elapsed since issuance of the collision sensing signals, timer 11 is put into operation and relay 11b closes relay contacts 11c. Thus, solenoid 8b of change-over valve 8 is energized as shown in FIG. 4c.

After some delay in the action, valve member 8a of valve 8 closes off line 14 at time $t_6$ and establishes communication between lines 13 and 15. Thus, inflation of air bag 9 is interrupted at time $t_6$ and follows the characteristic shown in FIG. 4a. As, at this time, the inflation volume Q of air bag 9 is smaller than F, no trouble is caused during subsequent driving of the vehicle. On the other hand, air container 6 continues to supply air, but this air is discharged through line 15 into the atmosphere.

The construction of change-over valve 8a is not limited to that shown in FIG. 2, as various kinds of change-over valves can be used, FIG. 3 illustrating one alternative embodiment. In FIG. 3, parts corresponding to those in FIGS. 1 and 2 are identified by the same reference numerals. Reference numerals 15a and 15b designate two lines each having one end open to atmosphere, and a cylindrical valve body, with which lines 13, 14, 15a and 15b communicate, is indicated at 16. Pistons $8a_1$ and $8a_2$ are slidably inserted in valve body 16, and are connected to operate as a unit by means of a rod $8a_3$.

In the change-over valve shown in FIG. 3, lines 13 and 14 are brought into communication, as shown in FIG. 3, as long as solenoid 8b is de-energized. When solenoid 8b is energized, rod $8a_3$ is attracted and displaced to the position shown by broken lines, so that lines 13 and 15a are brought into communication, and line 14 is brought into communication with line 15b.

The operation of the valve shown in FIG. 3 will now be described with reference to FIG. 4. When collision sensing signals are issued, solenoid valve 7 establishes communication between lines 12 and 13, and air bag 9 begins to inflate from the time $t_2$, with the vehicle crashing with an object at the time $t_3$. If the impact force, at this time, is small, or if no actual collision takes place, timing device 11 issues signals to energize solenoid 8b at time $t_5$ after a predetermined time $Tt$ has elapsed since issuance of the collision sensing signals. After some delay in the action, rod $8a_3$ is attracted by solenoid 8b at time $t_6$ and is displaced to the position shown by broken lines, so that the compressed air is discharged through line 15a to atmosphere, and the air in air bag 9 is discharged through lines 14 and 15b into the atmosphere. Thereby, air bag 9, inflated until time $t_5$, is deflated as shown by the characteristic of FIG. 4a, so that there is no trouble with subsequent driving of the vehicle.

It is possible to eliminate change-over valve 8. In such a safety device, impact detector 10 does not operate responsive to an impact force in excess of a predetermined magnitude, and line 12 is again closed by the solenoid valve when a predetermined time $Tt$ has elapsed after issuance of collision sensing signals, thus preventing further inflation of air bag 9. Needless to say, if the change-over valve is eliminated, the wiring of impact detector 10 or timer 11 will have to be changed somewhat.

If air bag 9 is inflated to a value greater than F%, trouble will be caused in driving a vehicle, but it depends largely upon the sense and the response of the passenger. Consequently, if the time during which the air bag is inflated for more than F% is less than about 100 ms, there will be no particular trouble in practice. From this standpoint, other means of deflating air bag 9 are possible to eliminate trouble in driving the vehicle in the case when the impact force is small or no actual crash occurs. This objective can be obtained virtually by operating change-over valve 8 so that the time during which the air bag is kept inflated to a value greater than F% is less than about 100 ms. If this procedure is adopted, the time $t_3$ for starting operation of change-over valve 8 can be delayed considerably more than in the embodiments described above. In the aforementioned embodiment, a too early setting of time $t_2$, for example, the starting time of inflation of air bag 9, should be limited, because, in a case where the interruption of inflation of air bag 9 is necessary, such inflation should not exceed F% at the time $t_2$, at which the inflation is to be interrupted. In the above-described procedure, however, such concern is obviated.

Figure 5A:
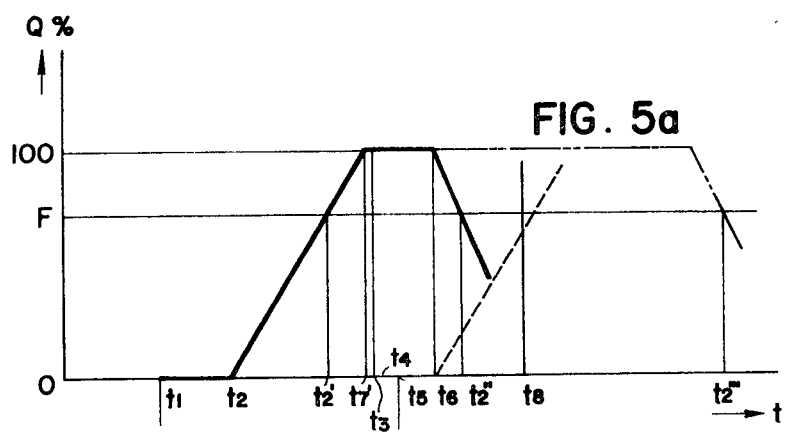
Figure 5B:
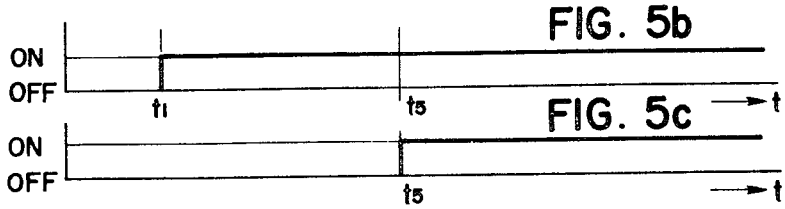
Figure 5C:
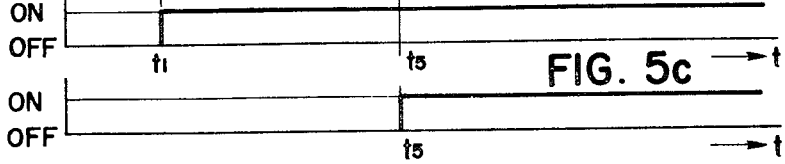

Referring to FIGS. 5a, 5b, and 5c, the change-over valve shown in FIG. 3 is utilized to carry out the above-mentioned procedure. In these figures, conditions corresponding to those in FIG. 4a, 4b, and 4c, are identified by the same reference numerals. The length of time from $t_2'$ until $t_2''$ is about 100 ms, which indicates the limit where continuing of the inflation of air bag 9 to a value greater than F% will cause trouble in driving the vehicle. The characteristic curve shows the operation of air bag 9 at the time of actuation of the safety device within the full extent of this limit.

When collision sensing signals are emitted at time $t_1$, solenoid 7b of solenoid 7 is energized to start inflation of air bag 9, and such inflation begins at the time $t_2$ after some delay in the action, in the same manner as described with reference to FIGS. 4a, 4b, and 4c. Air bag 9 continues to inflate and reaches a volume of F% at the time $t_2'$, thus restricting the vehicle operation. Inflation is continued and is completed at a time $t_7'$, so that 100 percent inflation is obtained. At the time $t_3$, when time limit $To$ has elapsed after the completion of inflation, the vehicle may strike an object or an actual crash may not occur. In either case, if impact detector 10 does not detect an impact force exceeding a predetermined magnitude, timing device 11 is put into operation to energize solenoid 8b at the time $t_5$ when a predetermined time $Tt$ has elapsed since emission of the collision sensing signals. Change-over valve 8 interrupts communication between lines 13 and 14 at the time $t_6$ after some delay in the action, and, at the same time, lines 13 and 13 are connected to atmosphere. Thus, the compressed air supplied to bag 9 is discharged into atmosphere and the air bag 9 is deflated as shown by the characteristic curve in FIG. 5a.

Air bag 9 continues to deflate down to F% at the time $t_2''$, and further until the pressure in bag 9 becomes equal to atmosphere.

While vehicle driving is restricted during the period of time from $t_2'$ until $t_2''$, this times does not exceed 100 ms, so that the inflated air bag does not cause any trouble with driving. On the contrary, if a large impact force is encountered upon occurrence of a collision, the impact detector 10 is operated, but change-over valve 8 does not operate. Consequently, the air bag is completely inflated and is in a waiting condition to protect vehicle passengers well before the occurrence of the crash, thus protecting the passengers from serious injuries.

In order to simplify the explanation, this invention has been described with reference to a simple model construction. The underlying technical concept of the invention resides in the actuation of the safety device for vehicle passengers before the occurrence of an actual crash by sensing the imminence of the crash and, at the same time, in the elimination of undesired actuation of the safety device by detecting the magnitude of the impact force in the event of a collision. Consequently, the construction is not limited to the embodiment already described. For example, the air bag may be appropriately provided with holes so that it can serve also as a damper when a passenger is pressed against the inflated air bag. In employing an air bag of this construction, the supply line between the source of air and the bag may be provided with a throttle valve operated by a signal from the impact detector, instead of by a change-over valve or a cut-off valve. Needless to say, the basic operation of the safety device embodying a throttle valve is the same as that previously described.

In the case where a collision actually occurs after it has been sensed, the provision of the timing device is not necessarily required, and instead, the change-over valve can be operated solely by the signal from the impact detector. The minor constructional modifications, such as those just mentioned, can be effected without departing from the scope and principles of the invention. Furthermore, the method of sensing the collision is not limited to the above-described method, but modifications and variations in a large number are possible.

Thus, in accordance with the invention, the air bag is inflated before the occurrence of the crash by sensing the crash, and the inflation is completed before a vehicle passenger strikes against part of the vehicle body, thus protecting the vehicle passenger from serious injuries due to the impact forces resulting from a collision of the vehicle. In the case of minor shocks such as, for example, in the case of a collision with a small animal, the air bag may be inflated due to the collision sensing signals, but, as it is possible to interrupt the inflation of the air bag, or to deflate it, not trouble is caused in subsequent driving and the occurrence of secondary injuries, due to the restricted driving resulting from undesired continuation of inflation of the air bag can be eliminated. Particularly, in a safety device employing a timing means, the same effect as mentioned above is obtained even in the case where the actual collision does not occur, even though collision sensing signals have been emitted. The characteristic features of the safety device embodying this invention are not only the safe and certain protection of vehicle passengers, in the event of vehicle collisions of any type and which tend to become increasingly frequent, but also the maintenance of orderly traffic around the vehicle in question without inflicting any injury or damages to third persons even in the case erroneous or undesired actuation of the device. The safety device is adapted to be mounted in vehicles of any kind, and is very advantageous for the prevention of traffic injuries and fatalities.

While specific embodiments of the invention have been shown and described in detail to illustrate the application of the principles of the invention, it will be understood that the invention may be embodied otherwise without departing from such principles.

What is claimed is:

1. In a safety device for vehicle passengers, of the type in which at least one air bag is inflated responsive to detection of an object in the vehicle path in advance of contact of the vehicle with the object, the improvement comprising, in combination, a source of fluid under pressure; a line connecting such source to at least one inflatable air bag; a valve mechanism interposed in said line and normally connecting said line to the air bag; an impact detector operable to detect the force of the impact between the vehicle and an object in its path, and to provide an output signal when said force has less than a predetermined magnitude; and means operable, responsive to said output signal, to operate said valve mechanism to disconnect said line from the air bag to interrupt inflation of the air bag.

2. In a safety device for vehicle passengers, the improvement claimed in claim 1, including a timing device adapted to emit signals after a predetermined elapsed time following sensing of a collision; said last named means being operable responsive to a logic product output signal derived from said timing device and said impact detector, to operate said valve mechanism to disconnect said line from the air bag to interrupt inflation of the air bag.

3. In a safety device for vehicle passengers, the improvement claimed in claim 1, in which said valve mechanism, when operated, connects the air bag to atmosphere to deflate the air bag.

4. In a safety device for vehicle passengers, the improvement claimed in claim 3, including a timing device operable, after a predetermined lapse of time following sensing of a collision and after the air bag has been fully inflated, to operate said valve mechanism to connect the air bag to atmosphere to deflate the air bag.

5. In a safety device for vehicle passengers, the improvement claimed in claim 1, in which said line includes a first line section connected to said source, a second line section, a third line section connected to the air bag and a fourth line section connected to atmosphere; a valve normally blocking communication between said first and second line sections and opened responsive to sensing of a collision; said valve mechanism comprising a valve normally establishing communication between said second and third line sections and blocking communication between said second and fourth line sections.

6. In a safety device for vehicle passengers, the improvement claimed in claim 5, including a normally de-energized solenoid operating said last-mentioned valve; and an energizing circuit for said solenoid including normally closed contacts controlled by said impact detector, said normally closed contacts being opened when said impact detectors detects an impact force at least equal to said predetermined magnitude.

7. In a safety device for vehicle passengers, the improvement claimed in claim 6, in which said last-mentioned valve is a pivoted flap valve.

8. In a safety device for vehicle passengers, the improvement claimed in claim 6, in which said last-mentioned valve is a piston valve operating in a cylinder connected to said line sections.

9. In a safety device for vehicle passengers, the improvement claimed in claim 6, including a timer and a pair of normally opened contacts included in said energizing circuit; said timer closing said normally opened contacts a predetermined time after sensing of a collision.

* * * * *